United States Patent [19]

Short

[11] Patent Number: 5,049,314

[45] Date of Patent: Sep. 17, 1991

[54] PAINT STRIPPING COMPOSITION CONSISTING ESSENTIALLY OF NMP AND ETHYL-3-ETHOXY PROPIONATE

[75] Inventor: Sidney M. Short, Old Town, Me.

[73] Assignee: Chute Chemical Company, Bangor, Me.

[21] Appl. No.: 675,286

[22] Filed: Mar. 26, 1991

Related U.S. Application Data

[63] Continuation of Ser. No. 398,052, Aug. 24, 1989.

[51] Int. Cl.$^5$ .................. C11D 3/28; C11D 7/50; C11D 3/44; C23D 17/00
[52] U.S. Cl. ................... 252/542; 252/153; 252/162; 252/170; 252/171; 252/172; 252/364; 252/DIG. 8; 134/38; 134/34
[58] Field of Search ............... 252/153, 162, 170, 171, 252/172, 542, 364, DIG. 8; 134/38, 34

[56] References Cited

U.S. PATENT DOCUMENTS

| | | | |
|---|---|---|---|
| 4,401,747 | 8/1983 | Ward | 430/258 |
| 4,666,626 | 5/1987 | Francisco | 252/153 |
| 4,780,235 | 10/1988 | Jackson | 252/170 |
| 4,788,002 | 11/1988 | King | 252/364 |
| 4,791,043 | 12/1988 | Thomas | 430/256 |
| 4,836,950 | 6/1989 | Madsen | 252/153 |

FOREIGN PATENT DOCUMENTS 1188311 7/1989 Japan .
0007628 12/1987 PCT Int'l Appl. .

*Primary Examiner*—Paul Lieberman
*Assistant Examiner*—Erin M. Higgins
*Attorney, Agent, or Firm*—Hayes, Soloway, Hennessey & Hage

[57] ABSTRACT

A paint stripping composition used in a process where it is applied to a substrate coated with fully or partially cured paint, having particular utility for use in stripping paint with other utilities, e.g. stripping organic polymer coatings also contemplated, and a method of employing same is described.

6 Claims, No Drawings

PAINT STRIPPING COMPOSITION CONSISTING ESSENTIALLY OF NMP AND ETHYL-3-ETHOXY PROPIONATE

BACKGROUND OF THE INVENTION

1. Technical Field

The present invention relates to a paint stripping composition used in a process where it is applied to a substrate coated with fully or partially cured paint. The composition of the present invention has particular utility for use in stripping paint and will be described in connection with such utility, although other utilities, for example, stripping organic polymer coatings, also are contemplated. The present invention is also directed to a method of employing the stripping composition.

2. Brief Description of the Background Art

A paint or varnish remover should ideally remove all traces of the coating quickly and with a minimum of labor, and it should leave the substrate unharmed and suitable for reprocessing or refinishing. A number of design criteria have been identified for a modern stripper: stripping ability, lack of corrosiveness to substrates, freedom from galvanic attack at the juncture of dissimilar materials, freedom from noxious and toxic chemicals, good shelf life, high viscosity, where needed, sealable internally or with a water cap to prevent rapid evaporation, and ability to leave a readily recoatable surface. See The Encyclopedia of Chemical Technology, Third Edition, Volume 16, 762–768 (1981).

Methylene chloride paint strippers have long been the industry standard for paint stripper performance. It has been established that methylene chloride is effective for quickly softening most types of paints. It has been suggested that the effectiveness of methylene chloride results from its smaller molecular size. Its low molecular weight enables it to penetrate rapidly into a coating, and its intermediate solvency enables the coating not to be dissolved so that redisposition on the substrate is avoided. Methylene chloride removers have also been modified to increase stripping power for special purposes. These modifying chemicals include amines, alkalies and organic acids. See U.S. Pat. No. 3,538,007 to Cooper et. al. Other reported uses of methylene chloride include solvent degreasing, plastics processing, blowing agent in foams, solvent extraction, a solvent for cellulose acetate, and as an aerosol propellant.

The safe use of methylene chloride has been questioned by Federal agencies including the Food and Drug Administration (FDA). As a chlorinated solvent, methylene chloride has now been closely regulated for environmental protection. Recently, it was discovered that methylene chloride can cause tumors in rats and mice. The $LD_{50}$ orally in rats (young adults) has been found to be 1.6 ml/kg. Furthermore, the threshold limiting value (TLV) has been set at 100 ppm in air. See Kimura, et. al., Toxicol. Appl. Pharmacol. 19, 699 (1971). Since these discoveries, the wide use of the solvent by industry and consumers has come under close scrutiny by federal regulatory agencies. See, U.S. Pat. No. 4,749,510 to Nelson. Accordingly, it is now highly desirable to avoid the use of methylene chloride in paint stripping formulations.

The search for an alternative product to methylene chloride has focused attention on pyrrolidone type compounds, more specifically, N-methyl-2-pyrrolidone (NMP). NMP is less toxic than many competitive aprotic solvents and does not appear to be a sensitizing agent. NMP, a dipolar aprotic solvent, has a high dielectric constant and cannot donate protons for hydrogen bonding. Consequently, many of its applications involve its strong and frequently selective solvating power. NMP is commercially available (e.g., from BASF Wyandotte or GAF) and used industrially as a processing aid for polymeric resins, in petroleum processing (e.g., the extraction of aromatics from lube oil), for the production of electronic circuitry, and as a general industrial cleaning ingredient. NMP is a colorless liquid with a mild amine odor, is miscible with water as well as various organic solvents. See the Encyclopedia of Chemical Technology, Third Edition, Vol. 19, 514–520 (1981).

Although NMP was recognized as an early candidate for replacing chlorinated solvent type paint strippers, it was soon discovered that a formulation based entirely on NMP had a number of disadvantages.

For example, NMP has low viscosity and low adhesive properties which work against its efficiency to remove dried coats of paint on a vertical surface. In U.S. Pat. No. 4,764,222 to Colegrove, a NMP composition is reported where a viscosifying agent (rhamsan gum) is added to the NMP to improve the ability of the composition to cling to a painted surface when inclined in a vertical position. An effort to optimize or target the paint removing efficiency and water solubility of NMP, while at the same time controlling and minimizing any potential toxicity and volatility, has led to a variety of specific formulations combining NMP with other organic and inorganic compounds. In U.S. Pat. No. 4,276,186 to Bakos et. al , cleaning compositions containing at least 50% by weight of NMP and at least about 5% by weight of a water miscible alkanolamine and about 0–35% by weight of a hydrocarbon solvent were described as especially suitable for removing solder flux from a ceramic substrate. In U.S. Pat. No. 4,664,721 to Valasek, non-aqueous compositions of NMP, butyl cellosolve and cyclohexanone and a surfactant are disclosed which degraded or solubilized broad classes of printing ink residues on printing screens. In U.S. Pat. No. 4,812,255 to Suwala, an aliphatic organic acid, an alkylene glycol ether and NMP are combined and reported effective as an overall composition for paint removal. In U.S. Pat. No. 4,732,695 to Francisco, a paint stripper and coatings remover composition consisted of three essential components: NMP, a mixture of aromatic hydrocarbons and benzyl alcohol. Finally, in U.S. Pat. No. 4,749,510 to Nelson, there is described a paint stripping composition comprising about 20–90% by weight NMP, 30–70% by weight aromatic hydrocarbon solvent, and about 1–15% by weight of either formic, oxalic, acetic, citric, gluconic or glutamic acid. According to another aspect of Nelson, organic amines such as diethanol amine could replace the various organic acids.

The combination of NMP with a variety of operative organic compounds represents what has been a longstanding effort to maximize the stripping ability of this alternative paint and coatings remover. While some of the presently disclosed paint strippers have relied upon formulations and proportions of active organic compounds in combination with NMP, none have recognized the novel and enhanced solvating power of the present invention which utilizes components that are commercially widely available, are less expensive than NMP, remove certain paints, coatings, inks or crayon at the same or better rate than NMP alone, can replace the majority of NMP in a given formulation, and are biodegradable, non-flammable and non-toxic.

It is accordingly an object of the present invention to provide an effective non-methylene chloride paint stripper composition that can be readily mixed and formulated to produce a stripper with the aforementioned solvating capability.

Another object is the provision of a stripper of the above type which can be applied by any conventional method, including wetting, wiping, spraying, brushing, dipping, troweling or otherwise.

Yet another object is to provide an effective composition with the aforementioned properties for cleaning urethane, polyester and epoxy compounds off of tools, molds, etc., particularly before the cure is complete.

A still further object is to provide a stripper composition of the above type which emulsifies with and can be completely removed by water.

SUMMARY OF THE INVENTION

The above and other objects and advantages are achieved by a stripper composition which comprises essentially of a mixture of the two following essential components: (1) a five-membered ring lactam, and (2) an oxygenated aliphatic solvent.

The composition preferably also contains certain other components including a thickener, preferably a cellulose ether derivative such as hydroxy propyl cellulose, a conventional surfactant, preferably tridecylalcohol-6-mole-ethoxylate, corrosion inhibitors, dyes and fragrances. All of these additional components are employed in effective amounts, particularly in certain ranges of proportions, as set forth in greater detail below.

The inventive composition is particularly effective for stripping and cleaning of paints, coatings, inks and crayon as well as cleaning some urethane, polyester and epoxy compounds off of tools, molds, etc., particularly before the cure is complete. The paint stripper composition of the invention is readily formulated from commercially available solvents and applied by any conventional method, including wetting, wiping, spraying, brushing, dipping, troweling or otherwise. The paint or coating is removed easily without any substantial waiting or soaking, followed by water rinsing to clean the removed paint. The paint/coatings stripper hereof readily emulsifies with water and is removed completely by water. As formulated the stripper composition of the invention is essentially non-flammable, non-carcinogenic, and non-toxic.

DETAILED DESCRIPTION OF THE PREFERRED EMBODIMENTS

One of the two essential components in the paint and coatings stripper formulation of the present invention is a five-membered ring lactone. Preferred in this group is N-methyl-2-pyrrolidone (NMP), as well as other hydrocarbon 2-pyrrolidones, for example, N-ethyl-2-pyrrolidone, N-isopropyl-2-pyrrolidone, N-cyclohexyl-2-pyrrolidone, 2-hydroxyethyl-2-pyrrolidone, N-dimethylaminopropyl -2-pyrrolidone, vinyl-pyrrolidone, 2-pyrrolidone and mixtures thereof. Particularly preferred is NMP which is a cyclic amide having a flashpoint (open-cup) of 95° C. The chemical formula for NMP is $C_5H_9NO$.

The second essential component of the present invention is an oxygenated aliphatic solvent. Preferred are esters of propionic acid, in particular the methyl, ethyl, propyl, isopropyl, butyl, isobutyl, 3-methylbutyl, pentyl, hexyl, heptyl, octyl esters of propionic acid, and mixtures of the foregoing. Particularly preferred is ethyl-3-ethoxypropionate which when combined with NMP provides the two primary constituents in the paint/coatings stripper composition of the present invention. Amongst other oxygenated solvents useful in the present invention which may be used in mixture with or as a substitution for the aforesaid esters of propionic acid are mentioned aliphatic alcohols such as butyl alcohol, amyl alcohol, hexyl alcohol, heptyl alcohol, furfuryl alcohol, tetrahydrofurfuryl alcohol, 2-butoxy ethanol; 2 or 3 carbon atom; alkylene glycol ethers such as propylene glycol mono-t-butyl ether, dipropylene glycol mono-methyl ether, and dipropylene gylcol mono-n-butyl ether; 6 to 8 carbon atom; aliphatic dibasic esters such as dimethyl succinate, dimethyl glutarate and dimethyl adipate; and aliphatic ketones such as diisobutyl ketone. While such other solvents provide a formulation which is relatively non-toxic, the speed of paint removal is not as great as when using ethyl-3-ethoxypropionate. It has been observed that up to 50% of the ethyl-3-ethoxypropionate may be replaced by 2-butoxyethanol with little or no apparent sacrifice in paint removal performance; however, 2-butoxyethanol is not preferred since it has been suspected of having toxic properties.

The amount of each of the two essential components in the final composition may vary within a certain range. What is important, however, is that each be present in an amount sufficient to provide the composition with effectiveness for stripping and cleaning of paints, coatings, inks and crayon as well as cleaning urethane, polyester and epoxy compounds off of tools, molds, etc., particularly before the cure is complete. Therefore, in accordance with the broad principles of this invention, the combination of the two essential components from the above mentioned classes is achieved by a consideration of the solvating capacities of the respective components, individually and in combination, in order to obtain the most desired biodegradable, least flammable and highest threshold limiting values to meet or exceed health and safety standards. Typically, the composition may contain from about 10-90% of the five-membered ring lactam, preferably from about 20-40%, and in the most preferred embodiment about 30-35% by weight of the paint stripper composition. The other essential component, i.e., the oxygenated aliphatic solvent, may be present in the composition from about 10-90% preferably from about 55-75%, and in the most preferred embodiment about 65-70% by weight of the paint stripper composition.

Surface active agents also may be utilized in the composition. These compounds tend to reduce the surface tension when dissolved in water or water solutions, or reduce interfacial tension between two liquids, or between a liquid and a solid. Therefore, in the context of the paint stripping formulations of the present invention, which is water soluble, the surface active agents serve to make the various stripping formulations amenable to water flushing from the treated surface. That is, when the assorted formulations of this invention are applied to non-water soluble paints and coatings, along with surface-active agents, such agents are further believed to effect an emulsion of the organic residues that have been removed from the various substrates on contact with water. Such emulsions can then be rinsed from the treated surface with water.

Surface-active agents may be of four types, nonionic, anionic, cationic or amphoteric. They are selected for solubility in the stripping formulation, low toxicity, the ability to form a useful emulsion of the formula with water, and biodegradability. Normally, if surface-active agents are included in the formulation, they are included in the amount from about 1 to 8 weight percent, and preferably from about 3 to 6 weight percent. A preferred embodiment of the present invention includes an oil soluble nonionic surfactant, the 6-mole ethoxylate of tridecyl alcohol which is available from GAF under the tradename Emulphogene 610, and from Stepan under the tradename Makon TD-6.

Corrosion inhibitors may also be included in the inventive formulation. Such corrosion inhibitors are conventional. Typical corrosion inhibitors include mono-, di-, and triethanol amines as well as many solvent soluble commercial preparations Other acceptable amines include diethylethanolamine, diisopropylamine, ethylamine, ethylenediamine, isopropylamine, monoisopropanolamine, morpholine, triethylenetetramine, and triisopropynolamine. Mixtures of such alkanolamines can be employed when desired.

For stripping vertical surfaces the addition of a thickener or gelling agent is highly desirable. The preferred thickeners or gelling agents are cellulose derivatives having the property of both water and organic solvent solubility. Cellulose derivatives of this type which are of particular interest are those ether derivatives containing etherifying groups selected from hydroxyalkyl groups and groups derived therefrom, such etherifying groups containing preferably up to about 5 or 6 carbon atoms. The gelling agent also may comprise cellulose ether derivatives which, in addition to etherifying groups selected from hydroxyalkyl groups and groups derived therefrom, contain other types of etherifying groups, especially small alkyl groups of, for example, one or two carbon atoms. However, such etherifying groups generally confer properties upon the cellulose derivative which are less acceptable for the present purpose, and the gelling agent is therefore conveniently substantially restricted to cellulose derivatives containing the etherifying groups selected from the hydroxyalkyl groups and groups derived therefrom.

Etherifying groups consisting of or derived from hydroxyalkyl groups containing up to 5 carbon atoms, particularly, 2, 3 or 4 carbon atoms, are of especial value. The hydroxypropyl celluloses, for example, have been found to be of particular value in imparting quite adequate thickening properties in their own right without the need for any other agents for these purposes. The hydroxypropyl group in these cellulose derivatives may be derived from either isopropanol or n-propanol and a number of variations are possible. For any etherification of cellulose, not all of the free hydroxy groups on the cellulose need necessarily be substituted. Consequently any free hydroxy groups, and the hydroxypropyl group itself, may be further substituted by treatment with other aliphatic alcohols. The hydroxypropyl celluloses employed in formulations according to the present invention have molecular weights in the range of 50,000 to about 1,000,000, preferably from about 800,000 to 1,000,000. Since the molecular weight of these described thickeners is directly proportional to their ability to alter the viscosity of a given formulation, the concentrations that are preferred for a desired viscosifying effect will vary depending on the molecular weight selected. The proportions of thickener in the formulations can be in the range of 0.25% to 10%, or even 15%, 18% or 20% by weight. Thus, for example, the usual proportion of thickening agent of from about 0.25% or 0.5% upwards is suitable for high molecular weight materials and of from about 3% upwards being suitable for lower molecular weight materials. For high molecular weight materials, for example molecular weights of 800,000 to 1,000,000 a proportion of above 1.5% is preferably avoided as it leads to a viscosifying effect of too large a magnitude. With low molecular weight materials, larger proportions may be used before such a position is reached and, if the molecular weight is low enough, amounts of up to 10% or even 20% or more may be used. It will be appreciated, however, that the use of a smaller amount of material of high molecular weight is generally to be preferred.

Dyes and fragrances can be selected according to the needs of product identification as well as aesthetics. The appropriate dye or fragrance should be chemically stable in the formulations, as well as having little or no effect on the ability of the given formulation to effect removal of the paint or coating from the substrate. Furthermore, the dye or fragrance should have little to no effect on the ability of the surface-active agent to create an emulsion so that rinsability with water is maintained. Preferably, only a small amount of such a dye or fragrance will be employed, from about 0.001% to 0.1% by weight of the entire formulation. Typical of such dyes are are Pylaklor LX-1911A Orange which is available from Pylam. Any commercially available fragrance may be employed.

WORKING EXAMPLES

The following examples, illustrative of the present invention, involve: mixing of the constituents together by blending with a mechanical mixer in a tank or other similar vessel. The formulation of this invention is prepared by first vigorously mixing the oxygenated aliphatic hydrocarbon solvent as the thickener is sifted over the surface of the solvent which then forms a fine uniform miscible mixture forming a gel. The thickener is added extremely slowly to permit the thickener to dissolve without forming a precipitate or large agglomeration. The extremely slow rate of addition of the thickener to the mixture is required due to the relative incompatibility of some of the cellulose ether derivatives. If some of the cellulose ethers are added too quickly, a precipitate or agglomeration will form and the cellulose ether will not function as a thickening agent for the paint/coatings stripper.

Next, the corrosion inhibitors, dyes, fragrances and lactone are added to the oxygenated alphatic solvent and cellulose ether, followed by the appropriate surface-active agent or mixture of surface-active agents.

The resulting formulation of the invention is used, preferably undiluted for removing paint or coatings from a substrate. The formulation may be applied to the paint or coated surface by spraying, brushing, dipping, troweling, or otherwise. The paint or coating on the surface is then softened by the reaction with lactam and the oxygenated aliphatic solvent and is held in suspension on the surface by the thickener, if present. After the paint or coating is softened, the stripper and loosened paint may be rinsed from the surface with water or manually scraped or sanded from the substrate. The paint stripper normally requires 1 to 30 minutes to soften the paint on the substrate, depending on the type of paint.

EXAMPLE 1

Following the procedure set forth above, the following formulation was prepared:

| Constituent | % by Weight |
| --- | --- |
| N-methyl-2-pyrrolidone (NMP) | 29.9 |
| Ethyl-3-ethoxypropionate | 65.0 |
| 6-mole ethoxylate of tridecyl alcohol | 5.0 |
| Fragrance | 0.1 |
| Dye (Pylaklor LX-1911A Orange) | 0.001 |

The resultant paint stripper removed paint as rapidly as NMP does alone and is significantly less expensive than NMP. The time required to completely strip cured and partially cured paint was about 1-5 minutes, depending on the type of paint, and only a single application was required. The paint on the surface was degraded and lifted off the substrate. Furthermore, it also removed lipstick and crayon much faster than NMP which makes this formula highly desirable for removing graffiti when the composition of the graffiti is unknown. The composition is highly biodegradable as demonstrated by the following data:

| Chemical Oxygen Demand = 1.71 kg/kg | | | |
| --- | --- | --- | --- |
| Biological O₂ | Concentration Tested | | |
| Demand (kg/kg/%) | 2 mg/l. | 5 mg/l. | 10 mg/l. |
| Day 5 | 0.550/32.2% | 0.610/35.9% | 0.720/42.1% |
| Day 10 | 0.700/40.9% | 0.740/43.3% | Septic |
| Day 15 | 0.950/55.6% | 1.00/58.5% | Septic |
| Day 20 | 1.20/70.0% | Septic | Septic |

The above tests were run by an independent laboratory using an unacclimated municipal seed. The fact that higher concentrations biodegraded faster and went septic indicates that the inventive formulations have no toxicity to treatment plant organisms. The % biodegradation is the BOD/COD multiplied by 100.

EXAMPLE 2

Following the procedure set forth above, the following formulation was prepared:

| Constituent | % by Weight |
| --- | --- |
| NMP | 29.9 |
| Ethyl-3-ethoxypropionate | 64.0 |
| 6-mole ethoxylate of tridecyl alcohol | 5.0 |
| High Viscosity hydroxypropyl cellulose | 1.0 |
| Fragrance | 0.1 |
| Dye (Pylaklor LX-1911A Orange) | 0.001 |

This example produces a high viscosity composition which is highly effective for stripping vertical surfaces. More particularly, water emulsions prepared with this formula are more stable than those made with Example 1.

EXAMPLE 3

Following the procedure set forth above, the following formulation was prepared:

| Constituent | % by Weight |
| --- | --- |
| NMP | 30.0 |
| Ethyl-3-ethoxypropionate | 70.0 |

Results: The formulation of Example 3 removed paint equally as fast as the formulation of Example 1, and has the advantage that it leaves no residue on air drying, and thus may advantageously be employed in the electronics industry. On the other hand, the formulation of Examples 1 and 2 will not adhere.

It is apparent that there has been provided in accordance with the invention a paint stripper formulation and a method of making and using the same. It will be readily appreciated that the composition and method of the present invention overcome the disadvantages associated with the prior art methylene chloride-based paint strippers.

The composition has a long work life which typically permits complete removal from the substrate with a single application regardless of the thickness of the paint accumulation. In most instances, since the stripper can be left on until all the paint is loosened. Indeed, many coatings will totally dissolve if soaked. This is a significant advantage of the present invention as compared to methylene chloride paint strippers.

The paints upon which the paint stripper of the present invention is effective include those conventionally used as automotive touch-up paints, metal enamels, lacquers, varnishes, polymer paints and others used in industrial processes and also general purpose household paints and surface coatings. In addition, the stripping formulations of this invention can remove many of the dyes and pigments associated with lipstick and crayon formulations which makes this formulation highly desirable for removing graffiti where the composition of the graffiti is unknown. The stripping composition of the present invention also can be applied to reactive-vehicle or solvent borne coatings, and has also proven effective for cleaning urethane, polyester and epoxy compounds off of tools, molds, etc., particularly if applied before the cure is complete. The composition also may be emulsified with water and remain effective on many latex coatings. Emulsions in the range of 70 parts to 30 parts of water to 30 parts of the inventive formulation to 70 parts of water, are particularly useful. While the invention has been described in conjunction with several specific embodiments, it is evident that many alternatives, modifications, and variations of the invention will be apparent in light of the foregoing description. Accordingly, it is intended to embrace all such alternatives, modifications, and variations as fall within the spirit and broad scope of the appended claims.

What is claimed is:

1. A non-toxic, biodegradable and ambient temperature non-volatile liquid paint stripping composition, wherein the active ingredient consists essentially of the combination of:
   (a) at least 30-90% by weight of a five membered ring lactam;
   (b) at least 10-70% by weight of an oxygenated aliphatic solvent selected from the group consisting of the methyl, ethyl, propyl, isopropyl, butyl, isobutyl, pentyl, hexyl, heptyl and octyl esters of 3-ethoxypropionic acid;
(c) about 0-10% by weight of a viscosifying agent selected from the group consisting of cellulose ether thickeners containing an etherifying group selected from hydroxyalkyl groups and groups derived therefrom, such etherifying groups containing 5 or 6 carbon atoms;
(d) about 0-5% by weight of a nonionic, anionic, cationic or amphoteric surface active agent; and
(e) about 0-1% by weight of a dye.

2. The composition of claim 1, wherein said five membered ring lactam comprises a lactam selected from the group consisting of N-methyl-2-pyrrolidone, N-ethyl-2-pyrrolidone, 2-hydroxy-ethyl-2-pyrrolidone, N-dimethylaminopropyl-2-pyrrolidone, vinyl-pyrrolidone, 2-pyrrolidone and mixtures thereof.

3. The composition of claim 1 wherein said lactam is N-methyl-2-pyrrolidone and is present in an amount of at least 30-40% by weight.

4. The composition of claim 1, wherein said oxygenated solvent comprises ethyl-3-ethoxypropionate and is present in an amount from about 55-75% by weight.

5. The composition of claim 1, wherein said oxygenated aliphatic solvent comprises ethyl-3-ethoxypropionate and is present in an amount of at least 65% by weight.

6. A method of stripping paint from a substrate surface which comprises the steps of:
(a) treating at room temperature the substrate surface with the composition of claim 1;
(b) allowing the composition to dwell on the surface for a sufficient period of time to degrade the paint; and
(c) removing the degraded paint by mechanical means or with pressurized stream of water.

* * * * *